United States Patent [19]

Sullivan

[11] 4,453,571
[45] Jun. 12, 1984

[54] SQUARE CORNER DESIGN FOR DUCTWORK

[75] Inventor: Robert P. Sullivan, Chattanooga, Tenn.

[73] Assignee: Combustion Engineering, Inc., Windsor, Conn.

[21] Appl. No.: 264,748

[22] Filed: May 18, 1981

[51] Int. Cl.³ .............................................. F16L 9/02
[52] U.S. Cl. .............................. 138/171; 228/263.11; 138/157
[58] Field of Search .............. 138/128, 156, 157, 158, 138/170, 171, 172, 151; 220/75, 4 R, 5 A; 228/4.1, 6 R, 165, 166, 184, 263

[56] References Cited

U.S. PATENT DOCUMENTS 1,651,604 12/1927 Keene ................................. 220/75 X
1,908,242 5/1933 Henderson ...................... 220/4 R X

FOREIGN PATENT DOCUMENTS 74804 4/1917 Switzerland ........................ 138/157

Primary Examiner—James E. Bryant, III
Attorney, Agent, or Firm—Arthur E. Fournier, Jr.

[57] ABSTRACT

An improved design for square cornered ductwork (10) particularly suited for use in those applications requiring ductwork capable of resisting pressures of 40" to 50" water gauge or higher, and wherein such pressures in turn produce end reaction loads that exceed two kips in magnitude. The subject square corner ductwork (10) includes a first member (12), a second member (14) having a width substantially equal to that of the first member (12), a third member (16), and a fourth member (18) having a width greater than that of the third member (16). The first member (12) and the second member (14) each lie in a plane that extends parallel to that of the other. The third member (16) and the fourth member (18) each lie in a plane that extends parallel to the other, and perpendicular to the plane of each of that of the first member (12) and the second member (14). The first member (12) is secured to the third member (16) by means of a first weld (20) recognizable as a structural weld; and to the fourth member (18) by means of a second weld (22) recognizable as a structural weld. The second member (14) is secured to the third member (16) by means of a third weld (24) recognizable as a structural weld, and to the fourth member (18) by a fourth weld (26) recognizable as a structural weld.

4 Claims, 4 Drawing Figures

SQUARE CORNER DESIGN FOR DUCTWORK

BACKGROUND OF THE INVENTION

This invention relates to ductwork embodying a generally rectangular configuration, and more specifically, to an improved form of square corner design for ductwork of the type that is intended for use in applications wherein there is a need for the ductwork to withstand increasingly higher pressures, and wherein such pressures are likely to produce proportionally higher stiffener end reaction loads, e.g., end reaction loads that exceed two kips in magnitude.

There exist many applications in which ductwork is normally employed wherein the pressures to which the ductwork is subjected are relatively high. For purposes of this discussion, relatively high pressures are considered to be pressures having values on the order of 40" to 50" water gauge or higher. The latter pressures are to be contrasted with pressures of a magnitude of 20" to 25" water gauge, which are the values of pressure that have heretofore normally existed in ductwork applications of a similar type.

One type of application, wherein ductwork which is capable of being subjected to such relatively high pressures is needed, is in connection with the functioning of a utility-type steam power generation installation. In this type of application, such ductwork is principally utilized for purposes of channeling the flow from one location to another of substances which are in gaseous form. In the course of effecting this channeling of gas flows from one location to another, there is frequently need that the ductwork change directions one or more times. Further, each of these changes in direction results in the formation of a corner at those locations whereat a change in direction occurs. More specifically, the corners formed at these locations result from the interconnection thereat of sections of ductwork which extend in different directions. Oftentimes, these sections of ductwork extend perpendicular to each other, thereby occasioning the establishment of a right angle corner.

Heretofore, the ductwork that has been employed in the type of application referred to above has commonly consisted of metal plate having both a stated thickness and a stated width. However, in view now of the need for the ductwork to be able to accommodate the increasingly higher pressures referred to above, existing ductwork designs are no longer deemed to suffice. Thus, a need has been evidenced for a new and improved form of design for ductwork wherein a ductwork constructed in accordance therewith is both of sufficient size to enable the desired volume of gas flow to be passed therethrough, and is of a sufficient strength to satisfactorily withstand the increasingly higher pressures, i.e., 40" to 50" water gauge or higher, to which the ductwork will be subjected. To the extent that a ductwork constructed in accordance with such a new and improved form of design embodies physical dimensions that exceed those of existing ductwork, the former, in comparison to the latter, is more difficult to handle, as one would normally expect. That is, the manipulation which is required in order to effect the fabrication and/or assembly of the ductwork is more difficult to accomplish with the former than with the latter.

Generally speaking, the mode of assembly that has been followed in the case of ductwork embodying prior art forms of construction has been one wherein the resulting ductwork has had a generally rectangular configuration. More specifically, such prior art ductwork has embodied a four-sided form of construction with each of the four sides being joined to two of the other three remaining sides in such a manner as to have a substantially flush fit therewith. Further, each of the four sides is secured to the corresponding two of the other three remaining sides by means of an external weld, i.e., a weld that is located on the exterior surface of the ductwork.

In the case of ductwork constructed of three-sixteenth inch metal plate in accordance with the teachings of the prior art, i.e., constructed in the manner to which reference has been had hereinbefore, the welds that have been utilized for purposes of securing the four sides of the ductwork together have, generally speaking, been limited to welds having a maximum dimension of one-eighth inch. This limitation, as regards the matter of the size of these welds, is basically one that is inherently derived. That is, this weld size limitation is dictated principally by the thickness of the metal plate that is to be joined, as well as the matter of the positioning of the weld itself. However, although such a size limitation has inherently existed in the case of much of the ductwork constructed in accordance with the teachings of the prior art that has been employed heretofore, this limitation on weld size normally has been of no moment, insofar as concerns the matter of the structural integrity of such welds. Namely, the strength of such welds has been more than sufficient to adequately resist loadings that are applied to the ductwork, e.g., loadings of a magnitude of up to two kips in the case of the end reaction loadings to which the corners of such ductwork are subjected. Yet, on the other hand, note is made here of the fact that it is virtually impossible, under the circumstances that exist in the case of prior art forms of ductwork construction that embody welds on the external surface thereof, to specify a minimum dimension for each of the welds that are utilized therein. As a consequence, the welds employed in the case of such prior art ductwork do not meet the standards of what commonly is recognizable as a structural weld.

In an effort to meet the requirements imposed on ductwork that are to be subjected to the increasingly higher pressures which have been previously referred to hereinabove, various different modes of assembly vis-a-vis those which have been utilized heretofore by the prior art, have been suggested for purposes of effecting the construction of such higher pressure capacity ductwork. For the most part, however, the modes of assembly that have been proposed for employment for this purpose are in the nature of jury-rigged forms of construction. That is, they seem to embody forms of construction that have been virtually customized to meet the requirements of particular individual applications for ductwork of higher pressure capacity. To this end, the higher pressure capacity ductwork resulting from the utilization thereof of such jury-rigged forms of construction is disadvantageously characterized in a number of respects including, but not limited to, those enumerated below: the cost thereof, the ease of fabrication thereof, the structural integrity of the welds thereof, etc.

A need has thus been evidenced for a new and improved form of construction for ductwork capable of being utilized in applications wherein the ductwork will be subjected to relatively high pressures, e.g., pressures of 40" to 50" water gauge or higher, and wherein the ductwork embodies the following features of an advantageous nature. First, the mode of assembly of the ductwork is such as to enable economies to be realized in the course of the assembly thereof. Secondly, the welds utilized for purposes of effecting the joining together of the sides of the ductwork are capable of having minimum dimensions specified therefor. Thirdly, each of the welds employed in the ductwork is effected in such a manner as to be recognizable as a structural weld. Fourthly, the ductwork is strong enough to resist the high stiffener end reaction loads to which the corners thereof are subjected. Fifthly, the ductwork is flexible enough to make allowance for the occurrence of some stiffener vibration, particularly in applications wherein large high pressure fans are cooperatively associated with the ductwork such as in utility type steam power generation installations. In summary, it is important to note here that one of the principal difficulties that is encountered in connection with effecting the design of a ductwork that meets the above listed criteria is to provide a ductwork wherein the corners thereof are suitably constructed such as to be capable of sustaining the high end reaction loads that are applied thereto, while at the same time the ductwork including the corners thereof possess sufficient flexibility so as to be capable of accommodating the vibrational effects that inherently are experienced thereby.

It is, therefore, an object of the present invention to provide a new and improved square corner design for ductwork of the type that is employable for purposes of channeling the flow of gases from one location to another.

It is another object of the present invention to provide such a square corner design for ductwork which is particularly suited for use wherein a requirement exists for ductwork that is capable of withstanding pressures having values of 40" to 50" water gauge or higher.

It is still another object of the present invention to provide such a square corner design for ductwork which is particularly suited for use wherein a requirement exists for ductwork that has the capability of successfully resisting end reaction loads at the corners thereof which exceed two kips in magnitude.

A further object of the present invention is to provide such a square corner design for ductwork that is desirably characterized in that not only are the corners thereof capable of sustaining relatively high end reaction loads, but also the ductwork embodies sufficient flexibility to accommodate the vibrational effects that inherently are experienced thereby.

A still further object of the present invention is to provide such a square corner design for ductwork that for purposes of effecting the joining together of the sides thereof employs welds, which are capable of having the minimum dimensions thereof specified.

Yet another object of the present invention is to provide such a square corner design for ductwork wherein the sides thereof are joined by means of welds, and wherein each of these welds is recognizable as a structural weld.

Yet still another object of the present invention is to provide such a square corner design for ductwork wherein engineering as well as manufacturing economies are capable of being realized therewith in the course of the construction thereof.

Yet a further object of the present invention is to provide such a square corner design for ductwork which is advantageously characterized in the fact that it is easily assembled.

SUMMARY OF THE INVENTION

In accordance with the present invention, there is provided a novel and improved square corner design for ductwork, which is particularly suited for use in applications of the type wherein it is necessary for the ductwork to be exposed to increasingly higher pressures, i.e., to pressures that have increased in magnitude from the pressure values of 20" to 25" water gauge which existed previously to pressure values of 40" to 50" water gauge or higher which are the pressure values that are now being encountered in such applications, and wherein these increasingly higher pressures have occasioned a proportional increase in stiffener end reaction loads, i.e., wherein the end reaction loads being exerted against the ductwork corners are now found to exceed two kips in magnitude. The subject square corner design for ductwork includes a first member, a second member having a width substantially equal to that of the first member, a third member and a fourth member having a width exceeding that of the third member. The first member and the second member each define a plane that extends in parallel relation to that of the other member. The third member and the fourth member each define a plane that extends in parallel relation to that of the other member, and in perpendicular relation to the planes of the first and second members. The first member has one lateral edge thereof which is joined to a lateral edge of the third member by means of a weld that extends from one planar face of the first member to one of the planar faces of the third member. In addition, the first member has the other lateral edge thereof joined to the fourth member at a point therealong, which is adjacent to one lateral edge of the latter, by means of a weld that extends from the other planar face of the first member to one of the planar faces of the fourth member such that the aforesaid one lateral edge of the fourth member transects the plane defined by the first member. The second member has one lateral edge thereof which is joined to the other lateral edge of the third member by means of a weld that extends from one planar face of the second member to the aforesaid one planar face of the third member. In addition, the second member has the other lateral edge thereof joined to the fourth member at a point therealong, which is adjacent to the other lateral edge of the latter, by means of a weld that extends from the other planar face of the second member to the aforesaid one planar face of the fourth member such that the aforesaid other lateral edge of the fourth member transects the plane defined by the second member.

DESCRIPTION OF A PREFERRED EMBODIMENT

Figure 1:
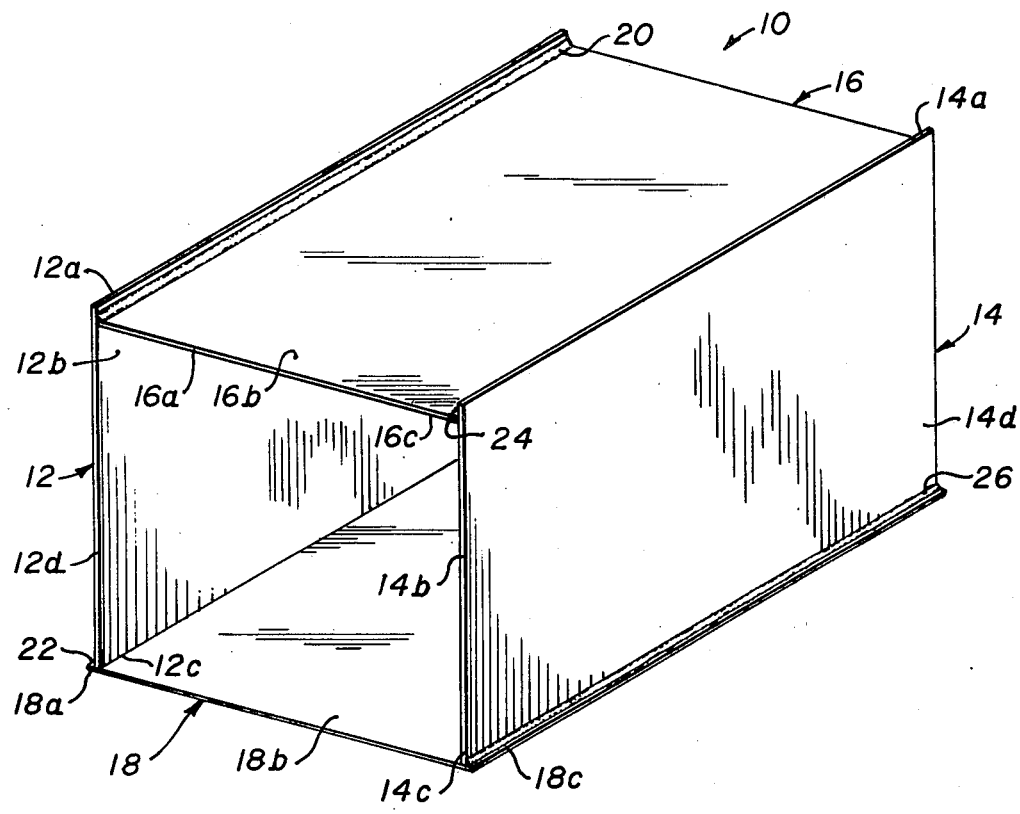
FIG. 1 is a perspective view of a square corner design for ductwork constructed in accordance with the present invention.

Referring now to the drawing, and more particularly to FIG. 1 thereof, there is illustrated therein a square corner design for ductwork, the latter being generally designated in FIG. 1 by reference numeral 10, constructed in accordance with the present invention. The ductwork 10 is particularly suited for use in applications of the type wherein it is necessary for the ductwork to be exposed to increasingly higher pressures, i.e., to pressures that have increased in magnitude from the pressure values of 20" to 25" water gauge which existed previously to pressure values of 40" to 50" water gauge or higher which are the pressure values that are now being encountered in such applications, and wherein these increasingly higher pressures have occasioned a proportional increase in stiffener end reaction loads, i.e., wherein the end reaction loads being exerted against the ductwork corners are now found to exceed two kips in magnitude.

With further reference to FIG. 1, the ductwork 10 as depicted therein has a four-sided configuration. More specifically, the ductwork 10 includes a first member 12, a second member 14, a third member 16, and a fourth member 18. The first member 12 and the second member 14 are each of substantially the same width. The width of the fourth member 18, on the other hand, exceeds that of the third member 16. Continuing as shown in FIG. 1, the first member 12 and the second member 14 each define a plane which extends parallel to the other. Likewise, the third member 16 and the fourth member 18 each define a plane that extends parallel to the other. In addition, the planes defined by the third member 16 and the fourth member 18 each extend substantially perpendicular to each of the planes of the first member 12 and the second member 14.

In the assembled state, and as will be discussed more fully hereinafter, the first member 12 is joined to both the third member 16 and the fourth member 18. Similarly, the second member 14 is also joined to both the third member 16 and the fourth member 18. To this end, the first member 12 is joined to the third member 16 and the fourth member 18 by means of welds 20 and 22, respectively. Likewise, the second member 14 is joined to the third member 16 and the fourth member 18 by means of the welds 24 and 26, respectively.

In accord with the best mode embodiment of the invention, each of the first, second, third and fourth members 12, 14, 16 and 18, respectively, is preferably made from substantially flat three-sixteenth inch metal plate. Further, the welds 20, 22, 24 and 26, respectively, each embody a specified minimum dimension such that each of the welds 20, 22, 24 and 26 is recognizable as a structural weld.

With further regard to the matter of the joinder of both the first member 12 and the second member 14 to the third member 16, the weld 20 functions to join the lateral edge 12a of the first member 12 to the lateral edge 16a of the third member 16. As such, the weld material of the weld 20 is applied to the planar face 12b of the first member 12 so as to extend therefrom to the planar face 16b of the third member 16. Similarly, the weld 24 effects the joinder of the lateral edge 14a of the second member 14 to the lateral edge 16c of the third member 16. To this end, the weld material of the weld 24 is applied to the planar face 14b of the second member 14 so as to extend therefrom to the planar face 16b of the third member 16.

Continuing with a description of the manner in which the sides 12, 14, 16 and 18 of the ductwork 10 are welded together in accordance with the present invention, reference will be had further to FIG. 1 of the drawing, from whence it should be readily understood that the other lateral edge, i.e., that denoted in FIG. 1 by reference numeral 12c, of first member 12 is joined by means of the weld 22 to the fourth member 18 at a point therealong adjacent to the lateral edge 18a thereof. More specifically, the weld material of the weld 22 is applied to the other planar face, i.e., that denoted through the use of reference numeral 12d in FIG. 1, of first member 12 so that the weld 22 extends therefrom to the planar face 18b of the fourth member 18.

In a fashion similar to that described above for the first member 12, the second member 14 is likewise joined to the fourth member 18. That is, the other lateral edge, i.e., that denoted by reference numeral 14c in FIG. 1, of the second member 14 is joined by means of weld 26 to the fourth member 18 at a point therealong adjacent to the lateral edge 18c thereof. To this end, the weld material of the weld 26 is applied to the other planar face, i.e., that bearing the reference numeral 14d in FIG. 1, of second member 14 so that the weld 26 serves to interconnect the planar face 14d of the second member 14 with the previously referred to planar face 18b of the fourth member 18.

With reference to the preceding description, note should be taken of the fact that the welds 20 and 24 which function to join the first member 12 to the third member 16 and the fourth member 18, respectively, are applied to different planar faces, i.e., the planar faces 12b and 12d, respectively, of the first member 12. Likewise, the welds 24 and 26 which function to join the second member 14 to the third member 16 and to the fourth member 18, respectively, are applied to different planar faces, i.e., the planar faces 14b and 14d, respectively, of the second member 14. On the other hand, however, the welds 20 and 24 which function to join the third member 16 to the first member 12 and the second member 14, respectively, are applied to the same planar face, i.e., planar face 16b of the third member 16. Similarly the welds 22 and 26 which function to join the fourth member 18 to the first member 12 and the second member 14, respectively, are applied to the same planar face, i.e., planar face 18b of the fourth member 18. Notwithstanding the existence of these relationships, however, note is further taken of the fact that each of the welds 20, 22, 24 and 26 is located on the exterior surface of the ductwork 10.

Referring again to FIG. 1 of the drawing, as shown therein at each location whereat the welds 20, 22, 24 and 26 are made, one plate member passes by the other plate member, e.g., first member 12 passes by third member 16 in the case of the weld 20, second member 14 passes by third member 16 in the case of the weld 24, fourth member 18 passes by first member 12 in the case of the weld 22, and fourth member 18 passes by second member 14 in the case of the weld 26. One significance of this fact is that it enables a downhand fillet weld to be made at each of these locations. Another significance thereof is that it enables a minimum dimension to be specified for each of the welds 20, 22, 24 and 26. In addition, it enables each of the welds 20, 22, 24 and 26 to be made in such a manner as to be capable of being recognized as a structural weld.

Figure 2:
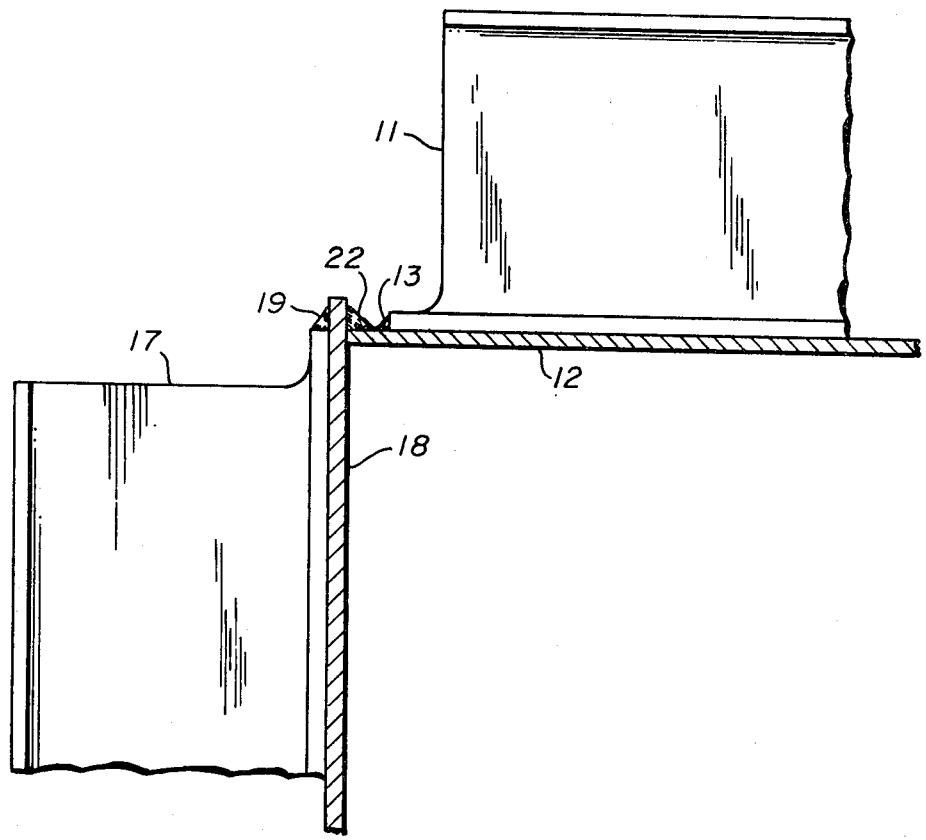
FIG. 2 is a partial sectional view with parts broken away of a square corner design for ductwork constructed in accordance with the present invention, illustrating the manner in which the duct plate members are cooperatively associated with the duct plate stiffeners.

Now, continuing on with the description of the ductwork 10 constructed in accordance with the present invention, and more particularly the manner in which channel stiffeners are cooperatively associated with the duct plate members 12, 14, 16 and 18 of the ductwork 10, reference will be had for this purpose to FIG. 2 of the drawing. In the latter Figure, there is illustrated a sectional view of a portion of the ductwork 10. Moreover, for purposes of the illustration of FIG. 2, the plate members that are shown therein will be considered to be the members 12 and 18 of the ductwork 10 of FIG. 1 that are suitably joined together by the weld 22.

As best understood with reference to FIG. 2, a channel-like member, generally designated by the reference numeral 11, is cooperatively associated with the duct plate member 12 such that the former operatively functions in the manner of a stiffener relative to the latter. Similarly, the channel-like member, generally designated by reference numeral 17, is cooperatively associated with the duct plate member 18 such that the former operatively functions in the manner of a stiffener relative to the latter. The channel stiffeners 11 and 17 are operatively connected to the plate members 12 and 18, respectively, through the use of any suitable, conventional form of connection means. However, in accordance with the best mode embodiment of the invention, the channel stiffeners 11 and 17 are preferably joined to the plate members 12 and 18 by virtue of being welded thereto. To this end, there is depicted in FIG. 2, weld means, generally designated by reference numeral 13, which is operative for purposes of effecting the joinder of the channel stiffener 11 to the duct plate member 12 and weld means generally designated by reference numeral 19, which is operative for purposes of effecting the joinder of the channel stiffener 17 to the duct plate member 18.

As their name suggests, the stiffeners 11 and 17 are intended to provide the plate members 12 and 18, respectively, with additional rigidity. Namely, the stiffeners 11 and 13 provide additional strength to the structure of the ductwork 10 such as to assist in enabling the latter to resist the end reaction loads to which the ductwork corners are subjected. Yet at the same time that there exists a need for rigidity, there also exists a need to provide the ductwork 10 with a sufficient degree of flexibility such that the ductwork 10 is capable of accommodating the vibrational effects that are inherently experienced by the latter. Lastly, it is to be understood that the number of stiffeners with which the ductwork 10 is provided is a matter of the degree of strength that needs to be imparted thereto, which in turn is predicated primarily upon the nature of the application in which it is desired to employ the ductwork 10.

From an engineering standpoint as well as a manufacturing standpoint, the square corner design for ductwork, i.e., the ductwork 10 of FIG. 1, which forms the subject matter of the present invention is advantageously characterized in a number of respects. For instance, from an analysis based on the application of commonly used engineering techniques to the form of ductwork shown at 10 in FIG. 1, it is readily possible to determine the nature of the particular structural requirements which ductwork constructed in accordance with the present invention must be capable of meeting in order to be successfully put to use in a given application having ascertainable operating parameters. As concerns manufacturing, ductwork constructed in accordance with the square corner design of the present invention offers an opportunity to reduce the time required for purposes of effecting the assembly of ductwork. This time saving is largely attributable to the fact that the entire ductwork is capable of being assembled through the use of four downhand fillet welds, e.g., the welds 20, 22, 24 and 26 depicted in FIG. 1, without necessitating that the ductwork be turned during the assembly operation. Also, in the context of manufacturing advantages there is the fact that the space requirements for effecting the assembly of ductwork are capable of being reduced therewith.

In addition to the advantageous features noted above, the square corner design for ductwork in accordance with the present invention has a number of other advantages. By way of exemplification, the square corner design form of construction of the present invention exhibits excellent flexibility for cyclic loading. Moreover, the square corner construction in accordance with the present invention greatly increases the allowable stiffener end reaction load capability when compared to prior art forms of square corner construction. More specifically, the square corner design for ductwork in accordance with the present invention allows for better distribution of stiffener load around the corner without restricting corner flexibility. That is, the form of square corner construction of the present invention better utilizes the strength of the corner angle because it allows for greater deflection of the corner angle. Note is made here of the fact that in accord with the structure for the square corner design for ductwork of the present invention the corner weld does not weld to the corner angle.

Figure 3:
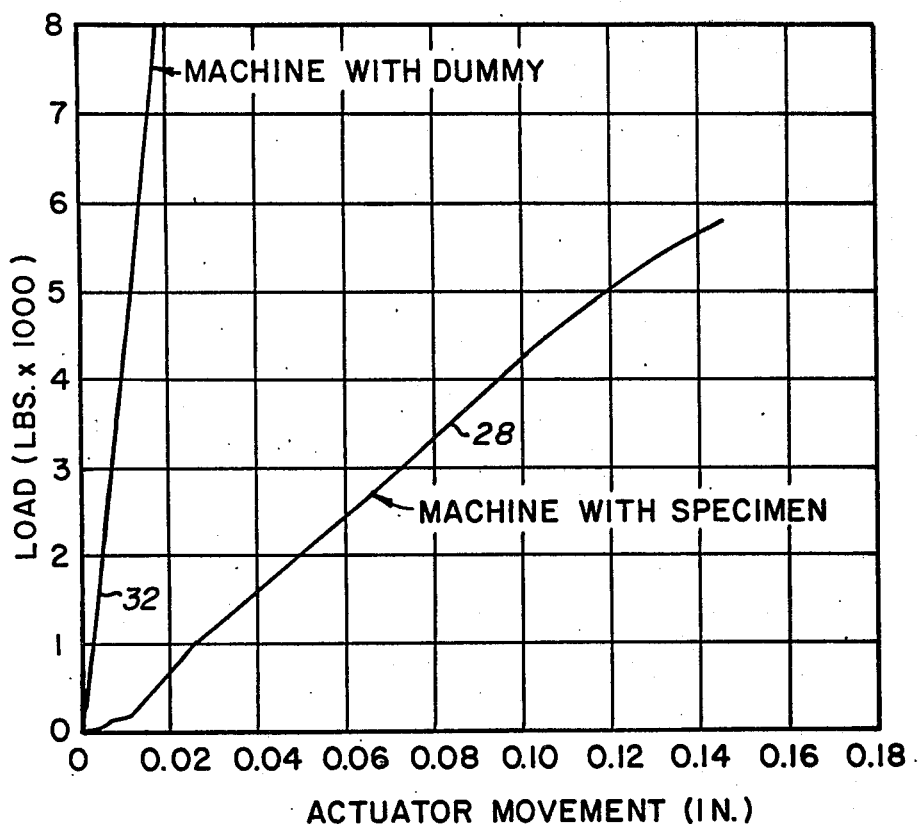
FIG. 3 is a graph depicting the static load test results for a prior art form of ductwork.
Figure 4:
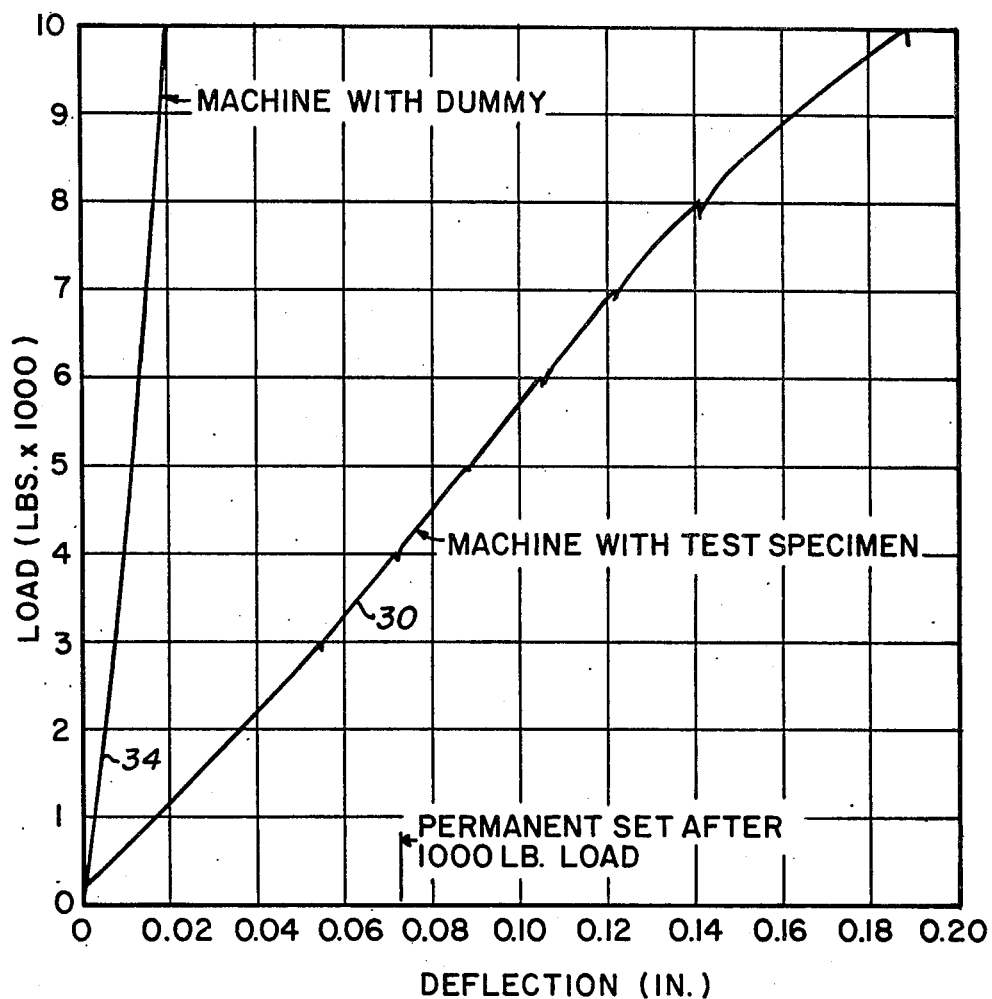
FIG. 4 is a graph depicting the static load test results for the square corner design for ductwork constructed in accordance with the present invention.

Referring now to FIG. 3 and 4 of the drawing, there is illustrated in the former a graph depicting the static load test results for a heretofore used prior art form of square corner construction, whereas there is illustrated in the latter a graph depicting the static load test results for the square corner design for ductwork in accordance with the present invention. More specifically, the curve designated by reference numeral 28 in FIG. 3 constitutes the test results obtained from performing static load tests on a previously used prior art form of square corner design for ductwork. Similarly, the curve designated by reference numeral 30 in FIG. 4 represents the results obtained from conducting static load tests on the square corner design for ductwork of the present invention. A comparison of curves 28 and 30 clearly demonstrates the superiority of the square corner design of the present invention vis-a-vis the prior art form of square corner design on which there was performed the static load tests which generated the curve 28 of FIG. 3. The curves denoted by the legends MACHINE with DUMMY, and which are identified by the reference numerals 32 and 34 in FIGS. 3 and 4, respectively, simply represent curves of a reference nature, utilized for purposes of the testing that produced curves 28 and 30.

By way of a brief summarization of the foregoing, present ductwork design pressures have increased significantly in the past several years. That is, they have increased from 20" to 25" water gauge to 40" to 50" water gauge or higher. Moreover, this higher design pressure has made the end reaction of the duct stiffener increase proportionally. Further, because of the higher stiffener end reaction, there has been demonstrated a need for a new and improved form of ductwork corner construction which is characterized in that it is economical to assemble, strong enough to accept the high stiffener end reaction loads, and flexible enough to allow for some stiffener vibration. The latter is a common problem with large high pressure fans used on large utility power generation units. In effecting the design of such a new and improved form of ductwork corner construction the difficult part of designing a duct corner that will sustain a high end reaction load is to provide the necessary flexibility that normally is not available with a high strength corner. In accord with the present invention, there has been provided such a form of ductwork corner construction which embodies all of the desirable requirements of a well designed corner. Additionally, load curves indicate that the yield strength of the ductwork corner of the present invention is more than twice the strength provided by previously known forms of ductwork corner construction. Also, the load curves demonstrate that the corner of the present invention possesses a proportional increase in flexibility over that possessed by prior art ductwork corners. Lastly, the duct corner of the present invention has the added advantage of allowing complete welding of the four edges of the duct section without rotating the duct assembly. In this connection, all assembly welding of the plate members of the ductwork of the present invention is accomplished by downhand fillet welding, and the fillet sizes thereof are independent of the plate member thickness.

Accordingly, from the foregoing, it should now be readily apparent that in accordance with the present invention there has been provided a new and improved square corner design for ductwork of the type that is employable for purposes of channeling the flow of gases from one location to another. Moreover, the square corner design for ductwork of the present invention is particularly suited for use wherein a requirement exists for ductwork that is capable of withstanding pressures having values of 40" to 50" water gauge or higher. In addition, in accord with the present invention a square corner design for ductwork which is particularly suited for use wherein a requirement exists for ductwork that has the capability of successfully resisting end reaction loads at the corners thereof which exceed two kips in magnitude. Furthermore, the square corner design for ductwork of the present invention is desirably characterized in that not only are the corners thereof capable of sustaining relatively high end reaction loads, but also the ductwork embodies sufficient flexibility to accommodate the vibrational effects that inherently are experienced thereby. Additionally, in accordance with the present invention a square corner design for ductwork is provided that for purposes of effecting the joining together of the sides thereof employs welds, which are capable of having the minimum dimensions thereof specified. Also, the square corner design for ductwork of the present invention embodies a form of construction wherein the sides thereof are joined by means of welds, and wherein each of these welds is recognizable as a structural weld. Further, in accord with the present invention a square corner design for ductwork is provided wherein engineering as well as manufacturing economies are capable of being realized therewith in the course of the construction thereof. Finally, the square corner design for ductwork of the present invention is advantageously characterized in the fact that it provides for ease of assembly.

While only one embodiment of my invention has been shown, it will be appreciated that modifications thereof, some of which have been alluded to hereinbefore, may still be readily made thereto by those skilled in the art. I, therefore, intend by the appended claims, to cover the modifications alluded to herein as well as all other modifications, which fall within the true spirit and scope of my invention.

What is claimed is:

1. In square corner ductwork that is particularly suited for use in applications of the type wherein it is necessary for the ductwork to be exposed to increasingly higher pressures of a magnitude of 40" to 50" water gauge or higher and wherein the end reaction loads being exerted against the ductwork corners exceed two kips in magnitude, said square corner ductwork including a first member having a pair of lateral edges and a pair of planar surfaces, a second member of substantially the same width as the first member, the second member having a pair of lateral edges and a pair of planar surfaces, the first and the second member each defining a plane that extends in parallel relation to that of the other, a third member having a pair of lateral edges and at least one planar surface, a fourth member of greater width than the third member, the fourth member having a pair of lateral edges and at least one planar surface, the third member and the fourth member each defining a plane that extends in parallel relation to that of the other member and in perpendicular relation to the planes of the first and second members, the improvement comprising weld means operative for securing together by welding the first, second, third and fourth members so as to provide the resulting ductwork with a substantially rectangular configuration, said weld means including a first downhand fillet weld, a second downhand fillet weld, a third downhand fillet weld and a fourth downhand fillet weld, said first downhand fillet weld extending from one planar surface of the first member to the at least one planar surface of the third member so as to effect the joinder of the first member to the third member by securing one lateral edge of the third member in abutting relation to said one planar surface of the first member and with one lateral edge of the first member projecting outwardly of said at least one planar surface of the third member, said second downhand fillet weld extending from the other planar surface of the first member to the at least one planar surface of the fourth member so as to effect the joinder of the first member to the fourth member by securing the other lateral edge of the first member in abutting relation to said at least one planar surface of the fourth member and with one lateral edge of the fourth member projecting outwardly of said other planar surface of the first member, said third downhand fillet weld extending from one planar surface of the second member to the at least one planar surface of the third member so as to effect the joinder of the second member to the third member by securing the other lateral edge of the third member in abutting relation to said one planar surface of the second member and with one lateral edge of the second member projecting outwardly of said at least one planar surface of the third member, and said fourth downhand fillet weld extending from the other planar surface of the second member to the at least one planar surface of the fourth member so as to effect the joinder of the second member to the fourth member by securing the other lateral edge of the second member in abutting relation to said at least one planar surface of the fourth member and with the other lateral edge of the fourth member projecting outwardly of said other planar surface of the second member.

2. In the square corner ductwork as set forth in claim 1 wherein the first member and the second member each comprises a metal plate of substantially three-sixteenth inch thickness.

3. In the square corner ductwork as set forth in claim 2 wherein the third member and the fourth member each comprises a metal plate of substantially three-sixteenth inch thickness.

4. In the square corner ductwork as set forth in claim 3 wherein said first downhand fillet weld, said second downhand fillet weld, said third downhand fillet weld and said fourth downhand fillet weld are all located on the exterior surfaces of the ductwork.

* * * * *